United States Patent [19]
Kiendl

[11] Patent Number: 5,509,747
[45] Date of Patent: Apr. 23, 1996

[54] ARTICULATION ARRANGEMENT FOR CONNECTING FOLDING STRUCTURE ELEMENTS

[75] Inventor: Helmut Kiendl, München, Germany

[73] Assignee: Deutsche Aerospace AG, Germany

[21] Appl. No.: 139,699

[22] Filed: Oct. 22, 1993

[51] Int. Cl.[6] .............................. B64G 1/44; F16M 11/42; F16M 13/00; F16H 21/10
[52] U.S. Cl. .......................... 403/102; 403/83; 403/322; 244/173; 136/245
[58] Field of Search .................................. 136/245, 292; 244/173; 403/104, 102, 83, 84, 322, 321; 52/173.3, 1, 71; 160/213, 229.1

[56] References Cited

U.S. PATENT DOCUMENTS

| | | | |
|---|---|---|---|
| 3,733,758 | 5/1973 | Maier et al. | 136/292 X |
| 4,437,783 | 3/1984 | Halin et al. | 403/321 X |
| 4,650,388 | 3/1987 | Frioux et al. | 403/322 X |
| 4,880,188 | 11/1989 | Roth et al. | 136/245 X |
| 5,037,043 | 8/1991 | Roth et al. | 136/292 X |
| 5,356,095 | 10/1994 | Aker | 136/245 X |

FOREIGN PATENT DOCUMENTS

| | | | |
|---|---|---|---|
| 3215431 | 10/1983 | Germany | 244/173 |
| 3418413 | 1/1986 | Germany | 244/173 |
| 282097 | 11/1989 | Japan | 136/245 |
| 234898 | 9/1990 | Japan | 244/173 |

OTHER PUBLICATIONS

Kellermeier et al., "The Retractable Ultra–Lightweight (ULP) Solar Array for Retrievable Space Platforms", Aircraft Engineering, pp. 2–5, Jan. 1984.

*Primary Examiner*—Anthony Knight
*Attorney, Agent, or Firm*—Evenson, McKeown, Edwards & Lenahan

[57] ABSTRACT

An articulation arrangement connects individual elements of a folding structure which consists of two or more individual elements and is configured to be unfolded and locked in an unfolded position and swivellably disposed on a central body. The arrangement comprises two hinge parts each rigidly fastened at one of two adjacent individual elements and swivellable about a common hinge axle, a slotted disk provided with a slot and forming part of one of the two hinge parts, a lever swivellably disposed on the other of the two hinge parts and provided with a pin. The pin is configured and arranged such that, before the unfolded position is completely reached, the pin slides on an edge of the slotted disk and, in the completely unfolded position at which locking occurs, the pin is engaged in the slot. For unlocking of the folding structure there are provided a rotatable cam plate with an edge curve of changing radius to disengage the pin and pulleys as well as driving and transmitting devices to rotate the cam plate and to transmit the rotation to the respective adjacent elements.

2 Claims, 5 Drawing Sheets

ARTICULATION ARRANGEMENT FOR CONNECTING FOLDING STRUCTURE ELEMENTS

BACKGROUND AND SUMMARY OF THE INVENTION

The present invention relates to an articulation arrangement for connecting individual elements of a folding structure and, more particularly, to an articulation arrangement for folding structures which consist of more than two individual elements and are configured to be unfolded and locked in an unfolded position and swivellably disposed on a central body. The arrangement comprises two hinge parts each rigidly fastened at one of two adjacent individual elements and swivellable about a common hinge axle, a slotted disk provided with a slot and forming part of one of the two hinge parts, a lever swivellably disposed on the other of the two hinge parts and provided with a pin which is configured and arranged such that, before the unfolded position is completely reached, the pin slides on an edge of the slotted disk and, in the completely unfolded position wherein locking occurs, the pin is engaged in the slot.

The present invention also relates to an articulation arrangement for a simplified folding structure which consists of only two individual elements and configured to be unfolded and locked in an unfolded condition and swivellably disposed on a central body, comprising two hinge parts which are each rigidly fastened on one of the two adjacent elements and swivellable about a common hinge axle, a slotted disk forming one of the two hinge parts, a lever swivellably disposed on the other of the two hinge parts and provided with a pin which is configured and arranged such that, before the unfolded condition is completely reached and the locking condition occur, the pin slides on an edge of the slotted disk and, in the completely unfolded locked condition, the pin is engaged in the slot.

One known articulation arrangement is shown in German Patent No. DE 32 15 434 C2 which describes a locking mechanism for unfoldable satellite solar generators. There, the folding structure is the solar generator which consists of individual panels constituting the individual elements. During the transport of the satellite into orbit, the solar generator is folded together and rests against the satellite which acts as the central body. After the removal of the satellite from the transport vehicle or after the final orbit is reached, the solar generator is unfolded, that is, brought into an elongated position, and is locked. For this purpose, the individual panels are connected with one another by articulation arrangements which permit the unfolding and subsequent locking in the unfolded condition. Each articulation arrangement is provided with two hinge parts which are each rigidly connected to one of the two adjacent panels or individual elements and can be swivelled about a common hinge axle. One of the two hinge parts has a slotted disk provided with a slot. On the other hinge part, a lever is rotatably disposed which is provided with a pin. During the folding operation, this pin slides on the edge of the slotted disk, and, after the conclusion of the unfolding operation, it will engage in its slot. A spring which exercises a tension between the hinge axle and the pin holds the pin in the slot in the locked condition.

A disadvantage of the known articulation arrangement is the fact that it is not constructed for permitting cancellation of the locked condition, i.e., an unlocking. However, such unlocking may be advantageous, particularly when satellites can be used several times or for testing operations on the ground, but also when it is desirable for carrying out maneuvers in the transfer path and/or the orbit or before changes of orbit to unlock and to fold the solar generator for a short time.

It is therefore an object of the present invention to provide an articulation arrangement which can be unlocked in a simple manner.

For folding structures with several individual elements or with only two individual elements, this is achieved by providing in the articulation arrangement a first pulley, arranged to be freely rotatably disposed on the one hinge part, a second pulley, arranged to be freely rotatably disposed on the other hinge part, a cam plate arranged to be freely rotatably disposed on the one hinge part and having an edge curve which changes continuously from a zone of minimal distance into a zone of maximal distance from an axis of rotation thereof, and which, in the unfolded position, rests with the zone of minimal distance against the engaged pin, and driving and transmitting means configured to effect simultaneous coordinated rotation of the first and second pulleys and of the cam plate, and to transmit the rotation to a pulley of an adjacent articulation arrangement or a pulley arranged to be freely rotatably disposed on one of the two hinge parts, a cam plate arranged to be freely rotatably disposed on one of the hinge parts and having an edge curve which changes continuously from a zone of minimal distance into a zone of maximal distance from an axis of rotation thereof, and which, in the locked condition, rests with the zone of minimal distance against the pin, and driving and transmitting means configured to effect simultaneous coordinated rotation of the pulley and of the cam plate.

In an embodiment of a folding structure with more than two individual elements, each articulation arrangement therefore has two respective freely rotatably disposed pulleys. The first of these pulleys is part of one and the second of the pulleys is part of the other of the two hinge parts of the articulation arrangement. In addition, a cam plate is disposed in a freely rotatable manner on one hinge part. The edge curve of this cam plate has a zone of minimal distance from its axis of rotation which changes continuously into a zone of maximal distance. In the fully unfolded and locked condition, the zone of minimal distance rests against the pin engaged in the slot of the slotted disk. Driving and transmission devices are provided which have the effect that, for the purpose of unlocking, the two pulleys and the cam plate of one articulation arrangement are set into a simultaneous and coordinated rotation, and which also have the effect that this rotation is transmitted to one of the pulleys of the next adjacent articulation arrangement. The rotation of the cam plate will now have the direct purpose of lifting the pin out of the slot of the slotted disk and thus releasing the locking. This unlocking will occur, at the latest, when the cam plate has rotated so far that its zone of maximal distance from the axis of rotation reaches the pin.

If there are only two individual elements of a folding structure, the articulation arrangement according to the present invention can be simplified considerably. The reason is that that pulley of the two pulleys may be omitted which, in the case of a folding structure comprising more than two individual elements, has the purpose of transmitting the rotation to one of the pulleys of the next adjacent articulation arrangement. The driving and transmitting devices which are required for this transmission will then also be omitted.

BRIEF DESCRIPTION OF THE DRAWINGS

These and further objects, features and advantages of the present invention will become more apparent from the following detailed description thereof when taken in conjunction with the accompanying drawings wherein.

DETAILED DESCRIPTION OF THE DRAWINGS

Figure 1:
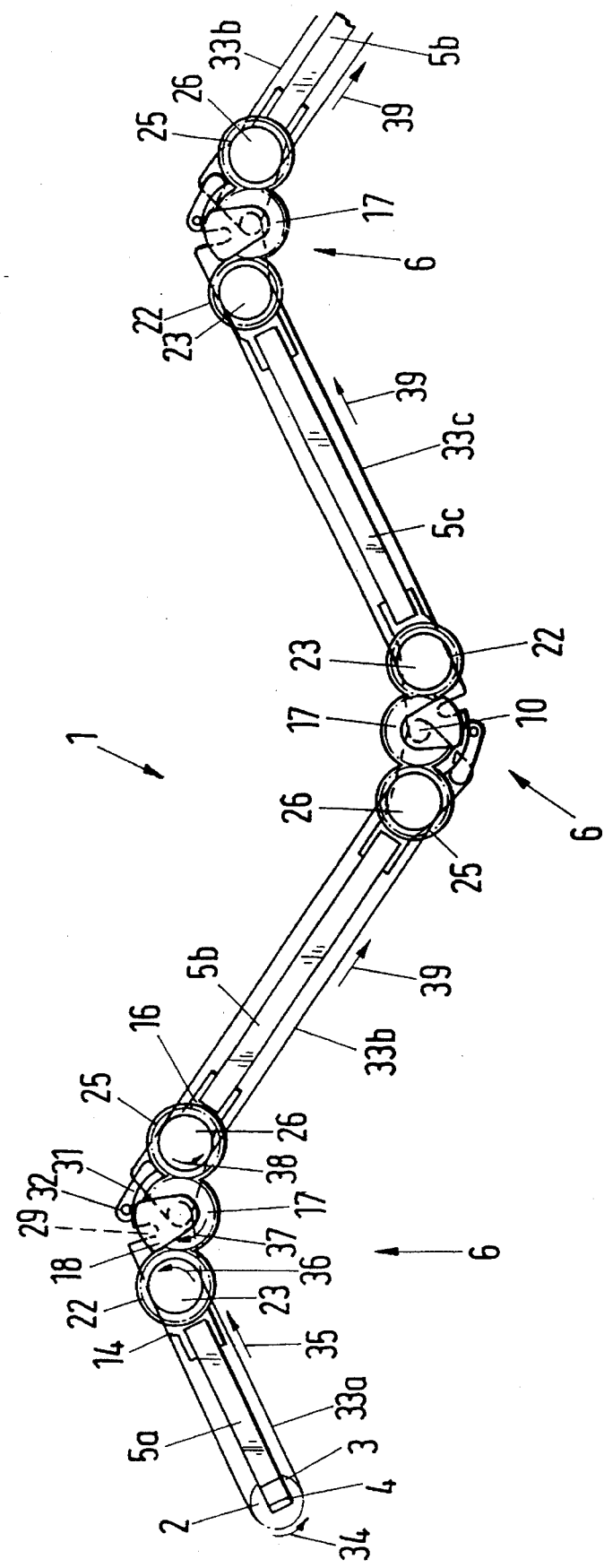
FIG. 1 is a view of an unlocked folding structure with several individual elements and articulation arrangements according to the present invention.

In FIG. 1, a folding structure, such as a solar generator of a satellite, consists of individual plates or elements 5a, 5b, 5c, etc. and is shown in the unlocked and slightly folded condition. An individual element 5a of half the width of the other elements is joined to an only outlined central body 2 with a pulley 3 and motor 4. Between the individual element 5a and the other full width individual elements 5b, 5c, etc., articulation arrangements designated generally by numeral 6 are inserted about which the individual elements can be swivelled. As indicated in FIG. 1, the articulation arrangements 6 are installed in the folding structure 1 alternately in an opposite orientation which is required for the folding of the individual elements, one on another.

Figure 2:
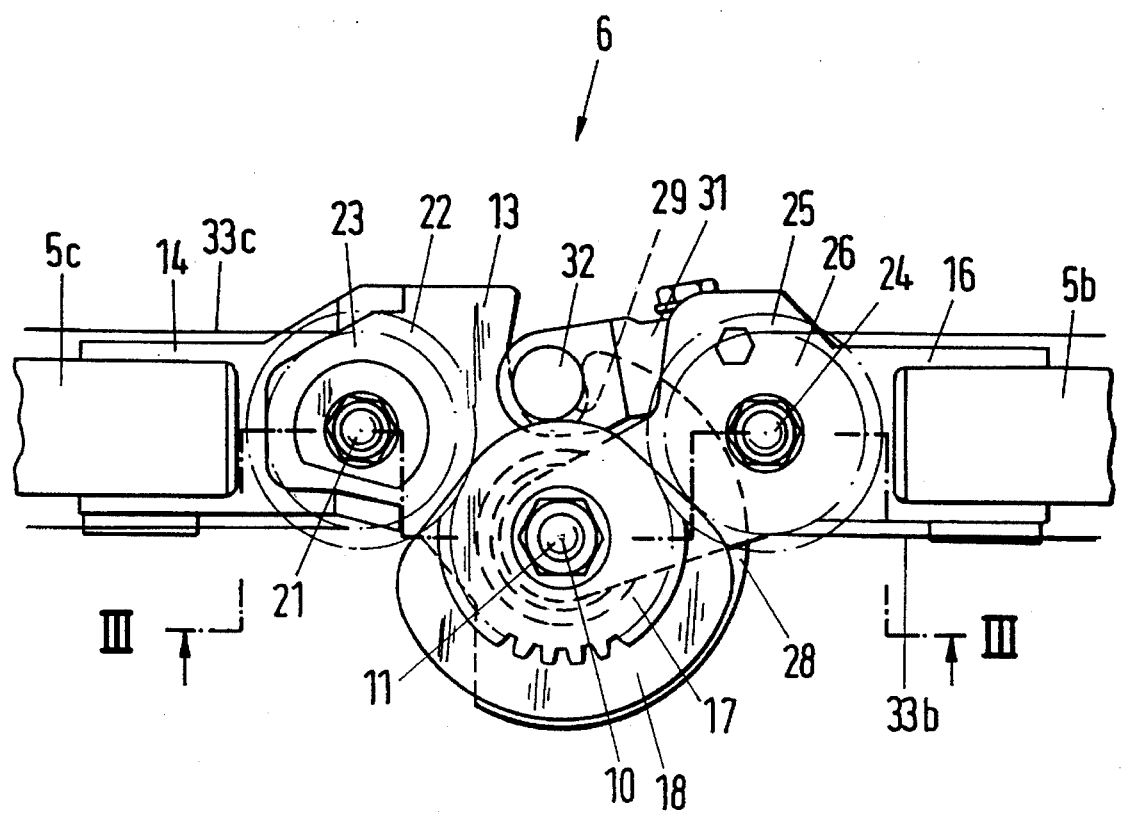
FIG. 2 is a side view of the articulation arrangement of the folding structure according to FIG. 1 but in the elongated locked condition.
Figure 3:
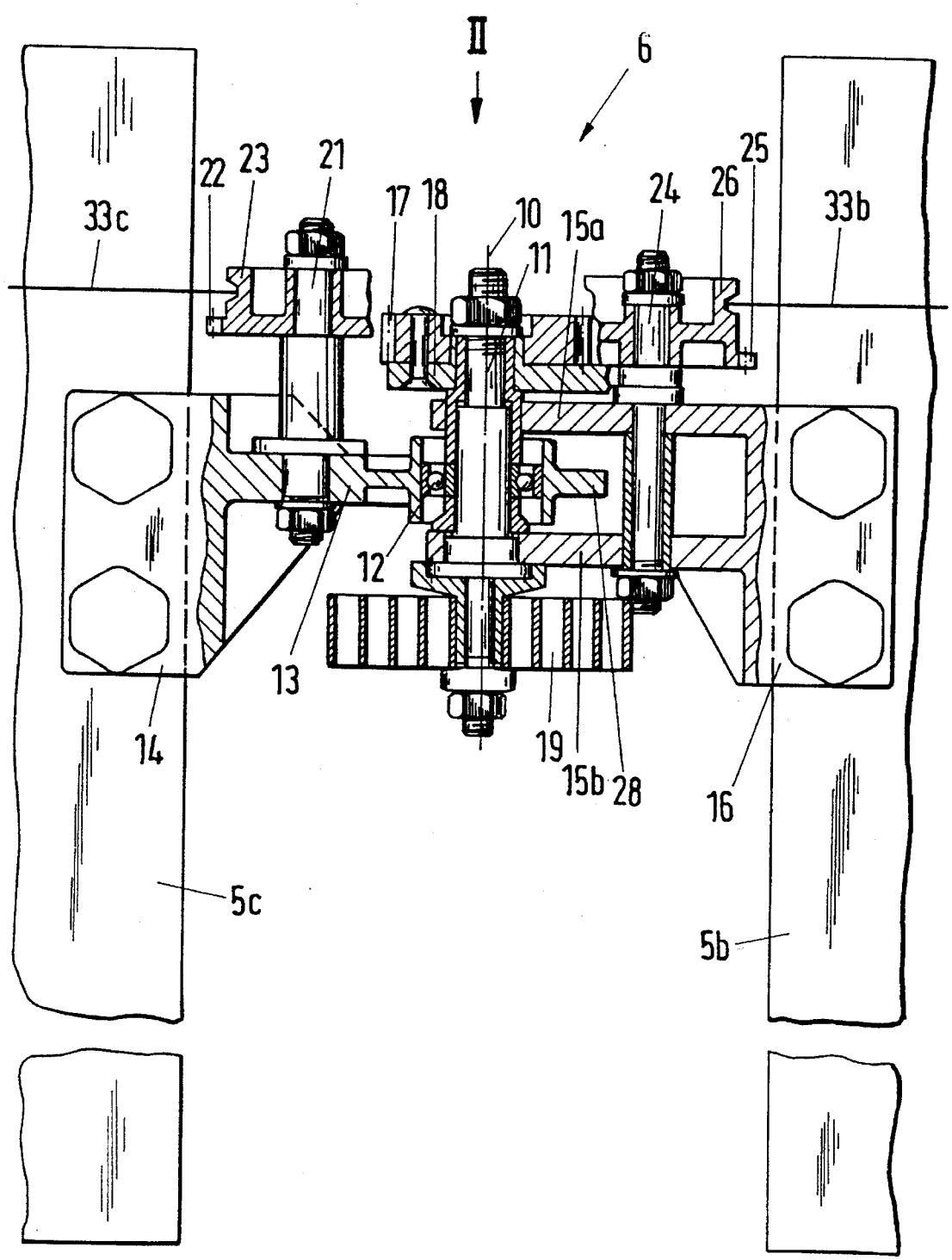
FIG. 3 is a sectional view along line III—III of the articulation arrangement of FIG. 2.

The details of the articulation arrangements 6 are illustrated in greater detail in FIGS. 2 and 3 which show the right-hand articulation arrangement of the articulation arrangements 6 of FIG. 1. A hinge axle 10 contains a hinge pin 11 which is connected with the individual element 5c via a ball bearing 12, a web 13 and a hinge part 14, and is connected with the individual element 5b via a fork 15a/15b and a hinge part 16. A toothed wheel 17 is placed on the top or end of the hinge pin 11, in a freely rotatable manner as is a cam plate 18 which is firmly connected with the toothed wheel 17. A flat coil spring 19 is placed on the bottom or other end of the hinge pin 11 for the unfolding of the two adjacent individual elements 5c and 5b. A king pin 21 is inserted into the web 13 and carries on top or at one end a freely rotatable toothed wheel 22, which interacts or engages with the toothed wheel 17, and a pulley 23 which is firmly connected with the toothed wheel 22. Another king pin 24 is inserted into the fork 15a/15b and carries on top or at one end another freely rotatable toothed wheel 25, which interacts or engages with the toothed wheel 17, and a pulley 26 which is firmly connected therewith.

In FIG. 2, the toothed wheels 17, 22 and 25 are illustrated schematically. Furthermore, a slotted disk 28 is shown which is connected with the web 13 and has a slot 29 into which a pin 32 can engage which is carried by a lever 31 pivotally connected to the fork 15a/15b. In the fully unfolded condition of the folding structure 1 shown in FIG. 2, the pin 32 is engaged in the slot 29. Over the pulleys 23 and 26, cables 33c and 33b are guided in a noslip manner and extend laterally of the individual elements 5c, 5b, respectively at a narrow distance from the latter.

As mentioned above, FIG. 1 shows the folding structure 1 at the start of the unfolding operation in the already unlocked condition. In order to initiate the unlocking, the motor 4 causes a counterclockwise rotation corresponding to arrow 34, in which case the pulley 3 is taken along and the cable 33a carries out a movement in the direction of the arrow 35. As a result, the pulley 23 and the toothed wheel 22 rotate in the direction of the arrow 36. As a result, the toothed wheels 22 takes along or drives both the toothed wheel 17 and the cam plate 18 in the clockwise direction of arrow 37, whereby the cam plate 18 lifts the pin 32 fastened on the lever 31 out of the slot 29. The toothed wheel 17 rotates the toothed wheel 25 and thus the pulley 26 in the counterclockwise direction of the arrow 38, whereby the cable 33b is moved in the direction of the arrow 39 and as a result, in the next articulation arrangement 6, the pulley 26 as well as by way of the toothed wheels 25, 17 and 22, the cam plate 18 and the pulley 23 are set into rotation. This operation continues with respect to the additional cables 33c, etc. and articulation devices 6.

The cables or cable loops 33a, 33b, etc., which act as the driving and transmitting devices, cause the simultaneous coordinated rotation of the respective first and second pulleys 23 and 26 together with the cam plate 18 of each articulation arrangement. In the case of the embodiment according to FIGS. 2 and 3, the driving and transmitting devices therefore include, in addition to the cables 33c, 33b, which are guided without slip on the respective first and the second pulleys 23, 26 and are constructed as cable loops, three toothed wheels 22, 17, 25, respectively which are each firmly connected with one of the two pulleys 23, 26 or with the cam plate 18 and, as illustrated schematically in FIG. 2, are in a mutual engagement. These toothed wheels are concentric with respect to the respective axes of rotation of the pulleys or cam plates. The first cable 33c and the second cable 33b of an articulation arrangement each form a cable loop with the first and second cable, respectively, of the articulation arrangement which is in each case the next adjacent articulation arrangement on one or the other side.

The cam plate 18 has an edge curve which changes from a zone of minimal distance continuously into a zone of maximal distance from its axis of rotation, specifically the hinge axle 10. In the locked condition of the folding structure 1, the edge curve of the cam plate 18, as illustrated in FIG. 2, rests with the zone of minimal distance against the pin 32 of the lever 31 which, in this condition, is engaged in the slot 29 of the slotted disk 28. Before the fully unfolded and locked condition is reached, the pin 32 slides during the unfolding movement on the edge of the slotted disk 28, specifically according to FIG. 2, counterclockwise until it finally takes up the engaged position illustrated there, in which case it is expediently supported by a spring (not shown) which acts between the pin 32 and the hinge axle 10 in a conventional manner.

Figure 4:
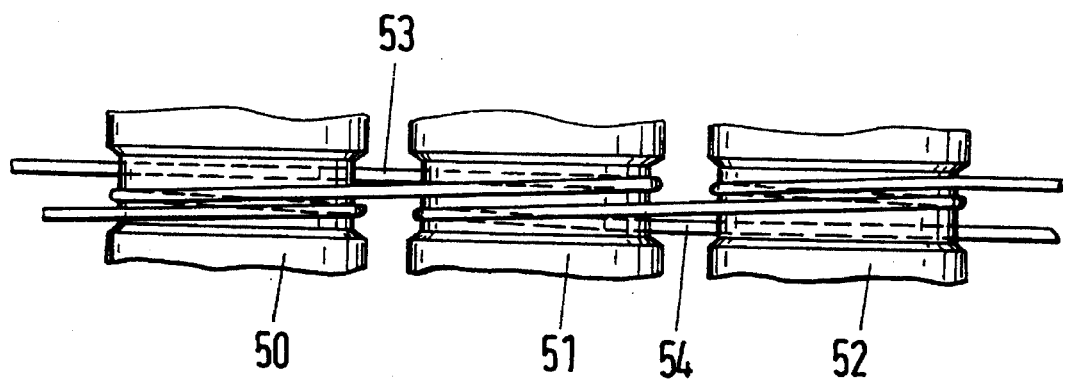
FIG. 4 is a simplified representation of the articulation arrangement similar to FIGS. 1 and 2 with cable guides.
Figure 5:
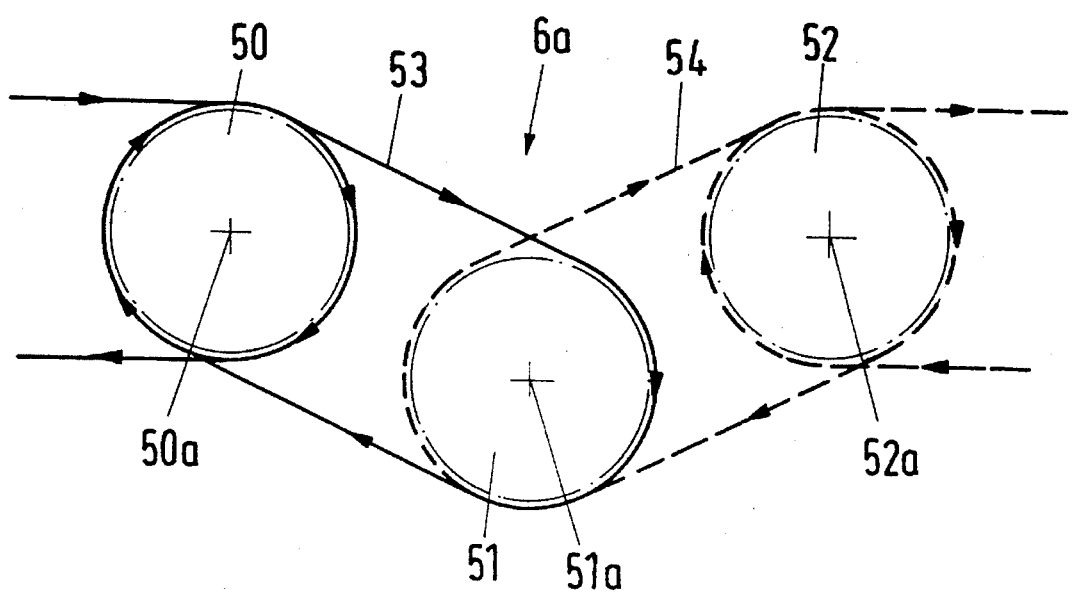
FIG. 5 is a top view of the articulation arrangement shown in FIG. 4.

FIGS. 4 and 5 illustrate that, instead of toothed wheels, only pulleys 50, 51, 52 need be used for the unlocking of the articulation arrangements. For the purpose of simplicity, only the pulleys 50, 51 and 52, which can be rotated about the axes 50a, 51a and 52a, of an articulation arrangement 6a are illustrated. A cable 53 runs on the outside around the pulleys 50, 51, runs back to pulley 50, winds around it and runs back, for example, to the motor 4 or to the adjacent articulation arrangement. Analogously, another cable 54 winds completely around pulley 52 and winds half or partially around pulley 51 and runs to the next adjacent articulation arrangement. The course of the cables 53, 54 is easily recognizable by way of the arrows shown in the side view of FIG. 4.

Figure 6:
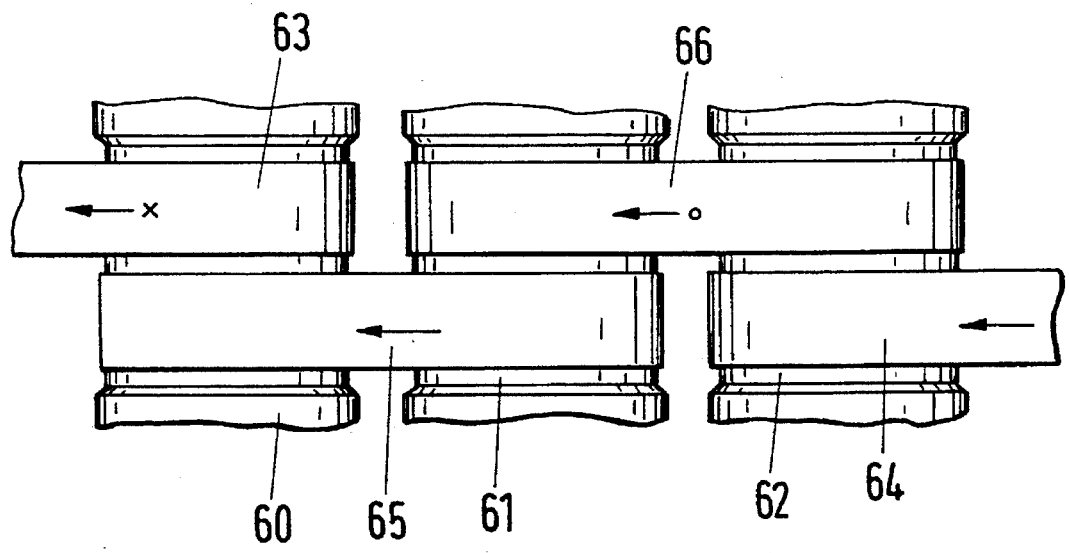
FIG. 6 is a simplified representation of an articulation arrangement similar to FIGS. 1 and 2, but with belt guides.
Figure 7:
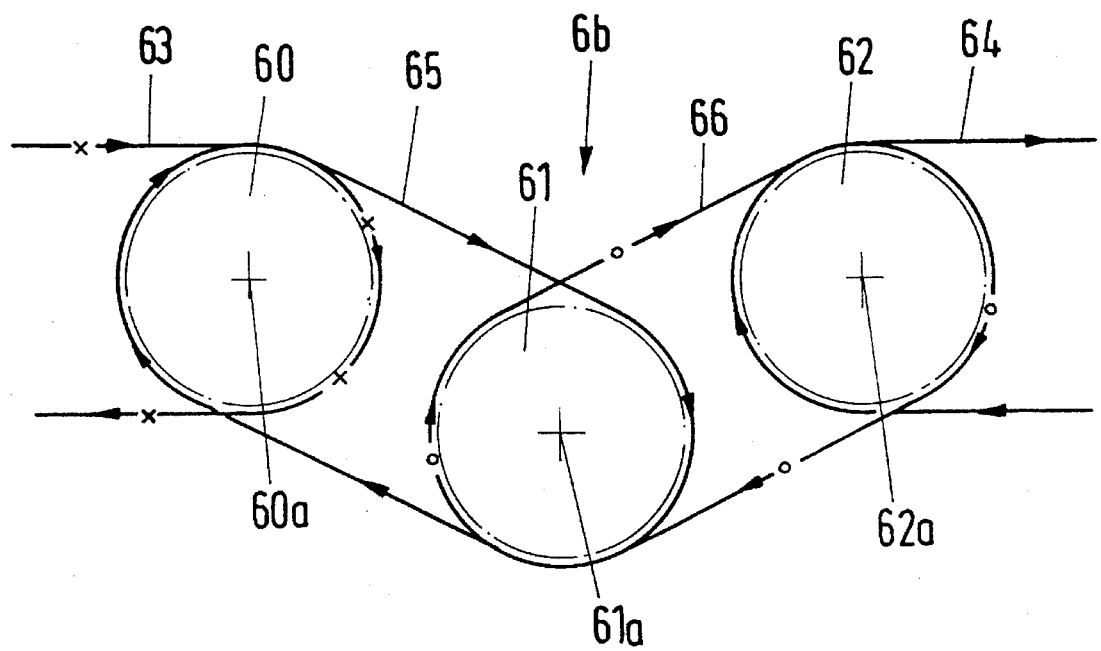
FIG. 7 is a top view of the articulation arrangement shown in FIG. 6.

FIGS. 6 and 7 show pulleys 60, 61 and 62 which are constructed as belt wheels and which rotate about axes 60a, 61a, 62a. Two belts or belt loops are guided without slip via each of the belt wheels 60, 61 and 62. The first belt 63 drives the belt loop 65 on belt wheel 60; belt loop 65, in turn, winds around the belt wheels 60 and 61 and drives a belt loop 66 which winds around the belt wheels 61 and 62 and drives the second belt 64 which is connected with the next articulation arrangement. The guiding and looping-around of the belts is also indicated by the arrows in FIG. 7.

In FIGS. 4 and 5, a first cable 53, which winds completely around the first pulley 50 and winds half or partially around a third pulley 51 which is firmly connected with the cam plate 18 (not shown), as well as a second cable 54 which winds completely around the second pulley 52 and winds half or partially around the third pulley 51, respectively, act as driving and transmitting devices which cause the unlocking of all articulation arrangements of the folding structure. In this embodiment, it is a prerequisite that the cables 53 and 54 are guided on the pulleys 50, 51 as well as 52 in each case without slip in a known manner. The first and second cables 53, 54 of each articulation arrangement 6a form common cable loops with the first and second cables, respectively, of the articulation arrangements which are the respective next adjacent articulation arrangements on both sides.

In the embodiment according to FIGS. 6 and 7, belts and belt loops act as driving and transmitting devices which are guided without slip on first and second pulleys 60, 62 as well as on a third pulley 61 which is firmly connected with the cam plate 18 (not shown), specifically a first belt 63 guided on the first pulley 60, a second belt 64 guided on the second pulley 62, as well as two belt loops 65 and 66 the one of which winds around the first and third pulleys 60 and 61 and the other of which winds around the third and the second pulleys 61 and 62. The first and second belts 63, 64 of an articulation arrangement 6b form respective common belt loops with the first and second belts of the articulation arrangement which is next on both sides.

In the above-described embodiments, the folding structure 1 consists of more than two individual elements. In a simple marginal case in which a folding structure consists of only two individual elements, the construction of the single articulation arrangement as well as the required driving and transmitting devices can be simplified correspondingly. Thus, in the case of an articulation arrangement according to the embodiment of FIGS. 2 and 3, one of the two pulleys with the assigned toothed wheel may be omitted because a transmission of the rotating movements to a next adjacent articulation arrangement is no longer required. Likewise, in the case of only two individual elements in the embodiments according to FIGS. 4 and 5 as well as FIGS. 6 and 7, one of the two first or second pulleys respectively with the pertaining cables or belts and belt loops may be omitted.

It should also be pointed out that the described articulation arrangements are used only for the locking as well as unlocking of the folding structure from the completely unfolded locked condition. The actual unfolding or refolding of the folding structure must be carried out by separate devices, such as springs, motors or cable controls.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An articulation arrangement for connecting elements of a folding structure configured to be unfolded and locked in an unfolded position and swivellably disposed on a central body, comprising two hinge parts each rigidly fastened to one of two adjacent individual elements and swivellable about a common hinge axle, a slotted disk provided with a slot and forming part of one of the two hinge parts, a lever swivellably disposed on the other of the two hinge parts and provided with a pin which is configured and arranged such that, before the unfolded position is completely reached, the pin slides on an edge of the slotted disk and, in the completely unfolded position wherein locking occurs, the pin is engaged in the slot, a first pulley, arranged to be freely rotatably disposed on the one hinge part, a second pulley, arranged to be freely rotatably disposed on the other hinge part, a cam plate arranged to be freely rotatably disposed on the one hinge part in operative association with the first and second pulley, which cam plate has a rotation axis and an edge curve which changes continuously from a zone of minimal distance into a zone of maximal distance from the rotation axis, and which, in the unfolded position, rests with the zone of minimal distance against the engaged pin, and driving and transmitting means configured to effect simultaneous coordinated rotation of the first and second pulleys, and of the cam plate, and to transmit the rotation to a pulley of an adjacent articulation arrangement wherein the driving and transmitting means comprises a first cable arranged to be non-slippingly guided on the first pulley, and a second cable arranged to be non-slippingly guided on the second pulley, and three toothed wheels firmly connected with one of the first or second pulleys and with the cam plate, and each concentric with respect to respective axes of rotation and in a mutual engagement with each other, whereby the first cable forms with the first cable of an articulation means being adjacent on the one side thereof and the second cable forms with the second cable of an articulation means being adjacent on the other side a respective common cable loop.

2. The articulation arrangement for connecting two individual elements of a folding structure configured to be unfolded and locked in an unfolded condition and swivellably disposed on a central body, comprising two hinge parts which are each rigidly fastened on one of the two adjacent elements and swivellable about a common hinge axle, a slotted disk forming part of one of the two hinge parts, a lever swivellably disposed on the other of the two hinge parts and provided with a pin which is configured and arranged such that, before the unfolded condition is completely reached and the locking condition occurs, the pin slides on an edge of the slotted disk and, in the completely unfolded locked condition, the pin is engaged in the slot, a pulley arranged to be freely rotatably disposed on one of the two hinge parts, a cam plate arranged to be freely rotatably disposed on one of the hinge parts to directly disengage the pin from the seat via an edge curve which changes continuously from a zone of minimal distance into a zone of maximal distance from an axis of rotation thereof, and which, in the locked condition, rests with the zone of minimal distance against the pin, and driving and transmitting means configured to effect simultaneous coordinated rotation of the pulley and of the cam plate wherein the driving and transmitting means comprises a cable arranged to be non-slippingly guided on the pulley, and two mutually engaging toothed wheels which, on one hand, are firmly connected with the pulley, and, on the other hand, are firmly connected with the cam plate and concentric with respect to respective axes of rotation thereof.

* * * * *